…

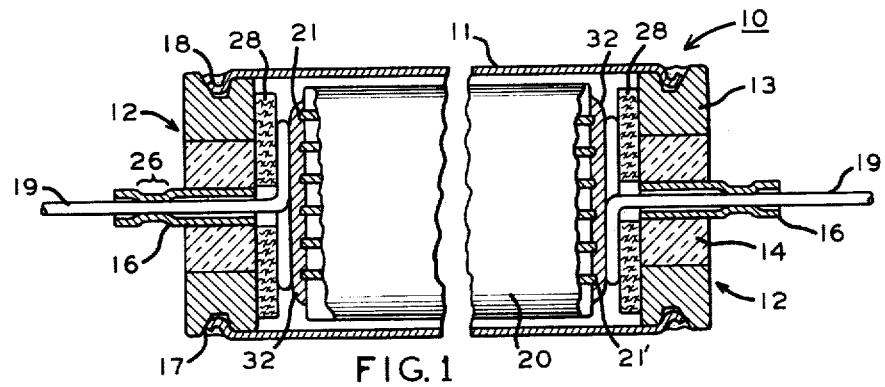
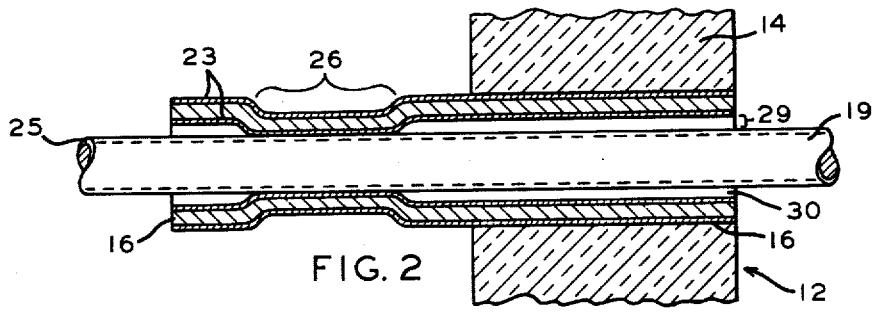
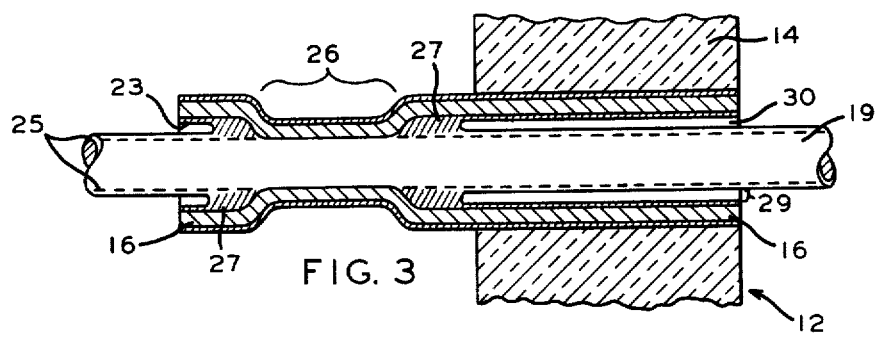
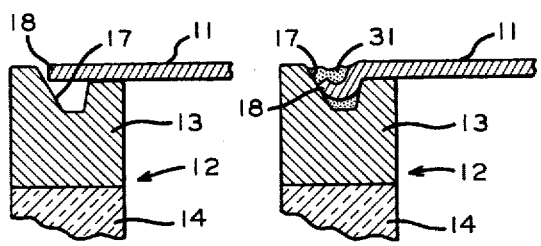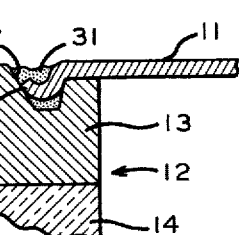
INVENTORS
LIVINGSTON L. RICE
WALTER J. ROHANE
BY *Connolly and Hutz*
THEIR ATTORNEYS

United States Patent Office 3,100,813
Patented Aug. 13, 1963

3,100,813
CAPACITOR SEALING MEANS
Livingston L. Rice, Williamstown, and Walter J. Rohane, Adams, Mass., assignors to Sprague Electric Company, North Adams, Mass., a corporation of Massachusetts
Filed Jan. 12, 1959, Ser. No. 786,277
2 Claims. (Cl. 174—52)

This invention relates to capacitor terminal constructions, and more particularly to sealing the end of a capacitor at the terminal lead.

Electrical components such as electrical capacitors comprise capacitance sections having terminal lead-wires extending therefrom. The sections are enclosed in casings with the terminal leads extending through the ends of the casings. The extending terminal leads provide means for electrical attachment to the contained section. In one type of capacitor a cylindrical capacitor section is mounted in a tubular casing. One of the more commercially acceptable capacitor constructions is the so-called "extended-foil capacitor" which comprises a capacitor section of electrode and dielectric ribbons convolutely wound with one of the electrode ribbons extending beyond the dielectric ribbons at one end of the convolute roll and another of the electrode ribbons extending beyond the dielectric ribbons at the other end of the roll. The roll is customarily a compact tightly wound subassembly in which the extended foils at each end are converted into a single terminal, as by the application of solder. To the common terminal formed by the solder operation there is applied a lead-wire which makes good electrical and mechanical contact with the extended foil. The lead-wire has an elongated member extending substantially axially from the convolutely wound roll. This subassembly carrying the attached lead-wires is in condition for mounting in a casing.

The convolutely wound subassembly is positioned in a tubular casing of such dimensions as to contain the capacitor section with the lead-wires that extend from the capacitor section passing out of the ends of the casing. The closure of the casing is affected by means of a plug-like closure member fitting into each end of the tubular casing. Each plug is provided with a passage means through which the respective lead-wire extends. Both ends of the rolled section are insulated from contact with the casing which may be composed of metal.

The end-seal member provides the insulation of the casing from the subassembly. The end-seal itself must be sealed so as to provide a complete closure of the capacitor section within the casing. This involves the sealing of the end-seal around the lead-wire. In the assembly of the parts, the end-seal must be provided with a sufficient passageway so that the lead-wire can be inserted through the end-seal. Also, in some constructions, it is necessary to provide a sufficient passageway to permit the introduction of impregnant into the interior of the casing through the opening in the end-seal. After the construction of the capacitor is completed, however, a seal is necessary at the passage of the lead-wire out of the casing. This seal must be sufficient to prevent any ingress or egress to and from the capacitor section within the casing. Also, the seal must be easy to effectuate in the regular assembly of the capacitor. It must be tight against seepage and accommodate both the characteristics of the plug material and of the metal terminal lead. Further, the seal must be closed without weakening the lead-wire or otherwise causing a severing of the lead-wire. The end-seal must seal the capacitor and receive terminal leads extending from the active section through the plug. The plug, in turn, must receive the terminal leads and seal them against egress and ingress. Further, the seal must be composed of an inexpensive material which is resistant to chemical action by the various dielectric impregnants.

The casing containing the capacitor section is sealed at an elevated temperature to create a partial vacuum within the casing, so as to militate against later explosion from the expansion that takes place when a unit becomes heated during use. As a result, creating the seal around the external extending lead-wire should act to both co-operate with the creation of this partial vacuum within the casing and also result in a hermetic seal which preserves the partial vacuum. Particularly to be avoided is the sucking into the casing of melted solder that may occur when the partial vacuum is broken.

It is an object of this invention to provide a capacitor terminal closure that effectively seals an encased capacitor section.

Another object of this invention is to provide a seal between an extending component lead-wire and a casing closure member such that the seal is not opened by the application of heat to the seal parts, so as to retain either vacuum or pressure within the casing.

A further object of this invention is the provision of a leak-proof seal at the end of a casing containing an electrical component such as a capacitor.

It is a still further object of this invention to provide an end-seal at an externally extending lead-wire of an electrical component, which seal does not impair the electrical characteristics of the lead-wire or its physical strength.

Still another object of this invention is a semiautomatic procedure for producing a crimped joint which is hermetically tight.

Another object of this invention is a joint between a lead-wire terminal and a tubulation which preserves a partial vacuum within a capacitor.

It is still a further object of this invention to provide a mechanically applied seal on the lead-wire to close a capacitor section within a casing.

These and other objects of this invention will become apparent from the following description taken with the accompanying drawing, in which:

FIG. 1 is an axial section partly in elevation of an electrical capacitor containing the invention;

FIG. 2 is an enlarged axial section of the terminal lead seal;

FIG. 3 is an other enlarged axial section of the terminal lead at the seal showing the hermetic seal;

FIG. 4 is a sectional view of the sealed component showing the rim before forming; and FIG. 5 is a sectional view of the formed rim seal of the container.

This invention seals the end of a capacitor casing with a metal-to-metal hermetically tight contact between a lead-wire and a lead enveloping tubulation. The tubulation in turn is mounted in a plug assembly which is sealed to the casing, as by jamming the casing rim into the plug periphery.

Referring to FIG. 1, a capacitor 10 is shown having a cylindrical casing 11 with its respective open ends each closed with an end plug 12. The end plugs 12 are substantially identical both in their constitution and in their relationship to the casing 11. Each end plug 12 of this invention is made up of a metal compression ring 13 and a glass annulus 14. Each glass annulus 14 is contained within and sealed to the respective donut shaped compression ring 13. Each glass annulus 14 has a tubulation 16 sealed in its central passage and extending axially outward from the end plug 12. Each tubulation 16 is shown as having a terminal lead-wire 19 extending axially therethrough. Each end plug 12 is retained in the respective open end of the casing 11 by engagement with a respective rim 18 of the casing 11. Each compression ring 13 has a peripheral groove 17 which receives the respective rim 18 of the casing 11, which is indented into the respective groove 17 by forming.

The casing 11 contains an active component in the form of an extended foil capacitor section 20. The section 20 is suitably prepared and inserted in the casing 11. The capacitance section 20 contains foils 21 and 21'. Foil 21 extends from one end of section 20 and foil 21' extends from the opposite end of section 20. The extended foils are wiped with solder to provide a solder terminal 32 which functions as a seat for the so-called pig-tail of lead-wires 19. Each of the leads 19 is in contact with the extending turns of one of the foils at its respective end of section 20. The lead-wires 19 contact the soldered extended turns of the foils and extend to the exterior of the capacitor 10 through a passage 30 in the respective tubulations 16. Each lead-wire 19 is retained within the passage 30 and in position with respect to capacitor section 20 by the novel crimp structure of this invention. The tubulation 16 is mounted in the end plug 12 and has sufficient internal diameter so that a space 29 is provided in passage 30 between lead-wire 19 and the inside of tubulation 16 to permit lead-wire 19 to pass easily through passage 30. This arrangement contributes to easy assembly of the parts.

In the illustration of FIG. 2 the central portion of one of the end plugs 12 is shown on an enlarged scale. The glass annulus 14 is bonded to the tubulation 16 by a suitable glass-to-metal bond. This bond is hermetically tight and permanently anchors the tubulation 16 in the annulus 14 against detachment or leakage. As shown in the enlarged drawing of FIG. 2 the spacing between the lead-wire 19 and the tubulation 16 is slight. In FIG. 2 the radial spacing of the parts is exaggerated to better illustrate this invention. In actual practice the lead-wire 19 is just small enough to fit through the passage 30. In the figures the clearance 29 between the outer periphery of lead-wire 19 and the inner surface of tubulation 16 is exaggerated for the purpose of illustration.

The lead-wire 19 is a tinned wire of suitable characteristics for effecting electrical connection to the capacitor section 20 through the respective foils 21 and 21'. The tubulation 16 has a tin coat 23 which covers both the inner and outer surfaces of the tubulation. The lead-wire 19 is provided with a layer of tin 25 applied over a copper surface. The tin coating 23 and the tin surface layer 25 are shown in section on the tubulation 16 and the wire 19 respectively in FIG. 2. The seal of tubulation 16 onto lead-wire 19 in final form is illustrated in FIG. 3. In the area of the crimped portion 26 the base metal of the tubulation 16 is brought into face-to-face contact with the copper metal of the lead-wire 19. The contact extends along the surfaces of the two axially extending parts (tubulation 16 and lead-wire 19) and forms a mechanical joint between the parts along this area of contact that is hermetically tight. Adjacent to this hermetically tight joint there are formed rings 27 of displaced tin. These rings 27 are located at the respective ends of the crimped portion 26 and lie within the tubulation 16 in the clearance space 29.

The sealed relationship between the sleeve 16 and the wire 19 is brought into effect by a two-stage crimping operation. In the drawing the result of the first stage operation is illustrated in FIG. 2, and the result of the second stage operation is illustrated in FIG. 3.

Suitable means for crimping tubulation 16 include a four-jaw chuck in which the jaws are heated to above the flow temperature of the tinned coatings on tubulation 16 and lead-wire 19. The first stage operation collapses the tubulation 16 inwardly of its axis against the lead-wire 19 and its surface layer 25. In collapsing tubulation 16 against lead-wire 19, the slight clearance 29 between the inside of the tubulation 16 and the outside of the lead-wire 19 is closed to bring the inner coat 23 against the surface layer 25 at the crimped portion 26. In this stage of the crimped portion 26, the respective inner and outer surfaces are brought into contact and are heated to above the flow temperature of the coatings on the surfaces.

The second stage of the crimping process brings the tubulation 16 and the lead-wire 19 into tight sealing relationship. In FIG. 3 the crimped portion 26 is shown at the completion of the second stage of the crimping process. In the second stage of the crimping process, the heated crimping jaws are forcibly applied against the crimped portion 26 to effect flow of tin coat 23 on the inside of tubulation 16 and layer 25 on lead-wire 19 which had been sufficiently softened and melted during the first stage. Sufficient force is applied through the crimping means to bring the base metal of the tubulation 16 into contact with the copper of the lead-wire 19. The tin coatings flow out of the area of the crimped portion 26. The tin coat flows both on the outer surface of the lead-wire 19 and on the inner surface of the tubulation 16. The crimping means are heated to about 100° C. above the flow point of the tinned surfaces so that the surface materials flow under pressure. The result is a mechanical joint in the area of the crimped portion 26 between the inner surface of tubulation 16 and the outer copper surface of lead-wire 19. The vacuum tight seal that results is between the base metal of the respective parts, tubulation 16 and lead-wire 19. The tin of the respective coat 23 and layer 25 in its displacement from the crimped portion 26 builds up on either side of the crimped portion in the blob-like rings 27 which are extruded by the second crimping operation so as to fill the portion of space 29 adjacent to the crimp between the sleeve 16 and the lead 19.

The construction of crimp 26 and its location on tubulation 16 are such that no strain is placed on glass member 14. The three parts of end seal plug 12, namely the tubulation 16, the glass annulus 14 and the compression ring 13 are sealed together and function to provide a hermetically tight plug. The crimp portion 26 secures the lead-wire 19 in this end plug 12 and forms the hermetically tight seal therewith.

A dielectric spacer annulus 28 is positioned between the capacitor section 20 and the end plug 12 at each of the respective ends of the capacitor 10. The respective spacers 28 fit between the inner surface of the end plug 12 and the parts within the casing 11 as shown at the inner ends of the leads 19 in FIG. 1.

The casing 11 is formed of a malleable material that can be spun and worked particularly at its edges. In FIG. 4 the junction of the end plug 12 with the rim 18 of the casing 11 is shown. The groove 17 in the circumferential peripheral surface of the ring 13 and the rim 18 of the casing 11 overlap to a point where the casing 11 can be readily formed to extend into the groove 17. In FIG. 5 the rim 18 is shown worked into the groove 17, in the form of an indentation. The rim 18 is placed between lateral walls of the groove 17. Thus, in the assembly of the capacitor 10 a structural connection is achieved between the end plug 12 and the casing 11 by the contact of the rim 18 in the ring 13 braced between the sloping side of the V-shaped groove 17. The fit of the parts is part of the moisture barrier of the end plug 12 in the capacitor 10. This moisture barrier prevents the penetration of moisture into the casing and egress of material from within the casing. After the lip 18 is indented into the groove 17 the connection of the end plug 12 in the capacitor is completed by filling the groove 17 with solder to cover the rim 18 from the outside and assists in creating the hermetic seal of the end plug 12 at this point. Indentation of rim 18 into groove 17 in the manner shown in FIGS. 4 and 5 enables the solder to be applied externally of casing 11, and hence avoids all the disadvantages of blind soldering that are inherent in prior art methods of closing capacitor casings. With the solder applied to the rim 18 in the groove 17 the fastening of the end plug 12 in the casing 11 is completed.

In the embodiment of this invention described in connection with FIGS. 1–3, section 20 comprises two electrodes convolutely wound in extended-foil fashion with suitable layers of dielectric material between the electrodes. One electrode 21 is shown as the foil which extends at the one end of the section, and the other electrode 21′ is shown as the electrode which extends at the other end of the section. Dielectric material is wound with the foils to provide the proper spacing of the foils. However, it will be understood that other types of capacitors and other electrical components can be contained within the sealed casing of this invention.

The casing 11 is shown sealed at both ends. The casing 11, however, may have a closed bottom at one end so as to receive the end plug 12 in only one end. Thus, while the invention has been described above as applied to a capacitor containing a dielectric impregnant within a metal casing, it will be understood that the above description and illustration is set forth for the purpose of presenting an embodiment and that this invention is applicable to other components. Various other modifications may be made to the above-described embodiment without departing from the spirit of this invention.

While the surface coatings 23 and 25 have been described as tin layers, it should be understood that any of the well known tin-lead solder formulations which are frequently employed in capacitor constructions may be utilized in the practice of this invention.

This invention avoids the disadvantages in prior sealing arrangements resulting from prior methods of sealing. An advantage is obtained in melting and displacing the tinned coatings in such a manner that the coating material is moved only to the immediate adjacent area and are cooled and retained permanently. This is the result of the local heating at the crimp portion with the maintenance of a relatively cool condition in the sleeve and lead at more removed portions. If the tinned coatings were subjected to more general heating they would move along more extensive areas of the parts. Under such conditions the low pressure within the casing 11 could cause the melted tin flow to be sucked into the interior of the unit whenever the capacitor was subjected to reheat in its circuit applications.

The capacitor of this invention is adapted to withstand temperatures of over 150° C. in operation without effect upon its end seal. It will be seen that the temperautres outside of the casing may exceed the melting point of the tin solder coat without opening the crimp 26.

A further advantage of this invention is found in the fact that no additional means of sealing at the terminal wire is necessary. The mechanical joint that is formed between the eyelet sleeve and the terminal wire is vacuum tight. This is not a solder seal but a true base metal-to-base metal interface of the parts. As such there is no danger of tin flow upon reheating as noted above. Another advantage of the mechanical grip between the tubulation and the lead-wire is the fastening of lead-wire 19 in tubulation 16 to avoid endwise movement and strain on solder contact 32 with the capacitor foil.

The crimping process is advantageous in dividing into two stages the operation of sealing the tubulation or eyelet to the terminal lead-wire. The important second stage can be concentrated and confined in nature. Stated otherwise, the eyelet surface is brought into contact with the lead-wire in the first and relatively non-critical stage of operation. Then the two parts can be sealed by a positive action which is more limited in duration as a result of the first stage preparation. Further, although the lead wire is tightly contained within the eyelet that surrounds it, it is not worked or thinned by the crimping action in the sealing operation and the copper surface of the wire remains unaffected with very little diameter change. When the unit is soldered in a circuit the heat for soldering applied to the terminal lead-wire cannot cause the seal of the lead to be destroyed.

What is claimed is:

1. An electrical device comprising a container, an end-plug closing said container, said end-plug having a metal tubulation extending therethrough and being provided throughout with a tinned inner surface, an electrical component having a lead-wire tin coated throughout the length thereof extending therefrom, said component being positioned within said container with said lead-wire extending through said tubulation, a substantial portion of said tubulation being deformed into intimate contact with said lead-wire such that the base-metal of said tubulation is in metal-to-metal contact with the base metal of said lead-wire whereby the tin of said tinned inner surface and the tin coat of said lead-wire are displaced from said substantial portion.

2. An electrical capacitor comprising a container, a glass-to-metal end-seal closing said container, said end-seal having a metal tubulation extending therethrough and beyond the end of said container, said tubulation being provided throughout with a tinned inner surface, a capacitance section having a lead-wire tin coated throughout the length thereof in electrical connection with an electrode and extending therefrom, said section being positioned within said container whti said lead-wire extending through said tubulation, a substantial portion of said tubulation beyond said container being deformed into intimate base-metal to base-metal contact with said lead-wire such that the tin of said inned inner surface and the tin coat of said lead-wire are displaced from said substantial portion.

References Cited in the file of this patent

UNITED STATES PATENTS

| 1,144,029 | Creighton | June 22, 1915 |
| 1,991,767 | McCullough | Feb. 19, 1935 |
| 2,266,523 | Waterman | Dec. 16, 1941 |
| 2,445,993 | Beggs | July 27, 1948 |
| 2,459,193 | Sparks et al. | Jan. 18, 1949 |
| 2,803,693 | Kurland et al. | Aug. 20, 1957 |
| 2,815,497 | Redslob | Dec. 3, 1957 |
| 2,856,674 | Hill | Oct. 21, 1958 |
| 2,873,510 | Duran et al. | Feb. 17, 1959 |

FOREIGN PATENTS

| 198,171 | Austria | June 10, 1958 |

OTHER REFERENCES

Serial No. 352,040, Gonningen (A.P.C.), published May 18, 1943, now abandoned.

Coursey: Proc. I.E.E., Part 3, January 1950, pages 56–63.

UNITED STATES PATENT OFFICE
CERTIFICATE OF CORRECTION

Patent No. 3,100,813                                 August 13, 1963

Livingston L. Rice et al.

It is hereby certified that error appears in the above numbered patent requiring correction and that the said Letters Patent should read as corrected below.

Column 6, line 37, for "whti" read -- with --; line 41, for "inned" read -- tinned --; same column 6, list of References Cited, under the heading "UNITED STATES PATENTS", add the following reference:

2,638,573    Glickman et al.------May 12, 1953

Signed and sealed this 28th day of April 1964.

(SEAL)
Attest:

ERNEST W. SWIDER                               EDWARD J. BRENNER
Attesting Officer                                    Commissioner of Patents